UNITED STATES PATENT OFFICE.

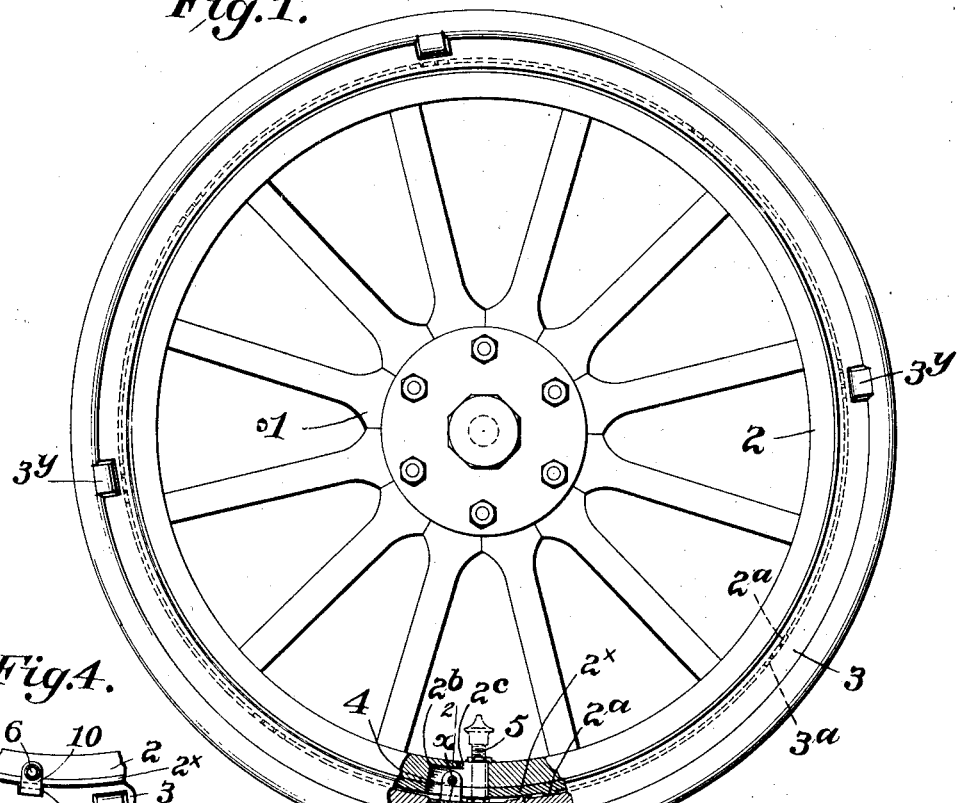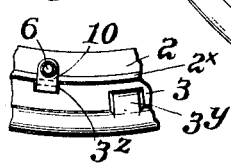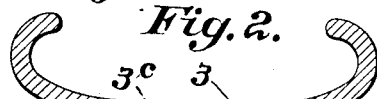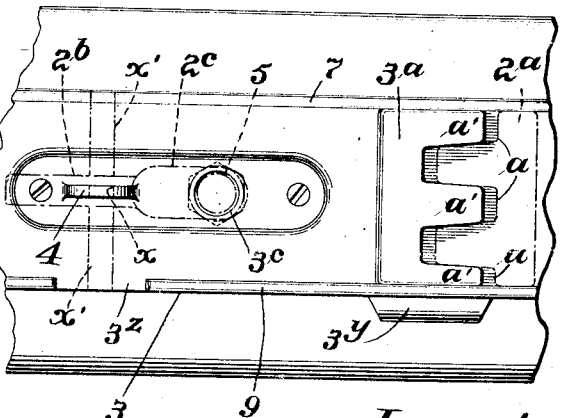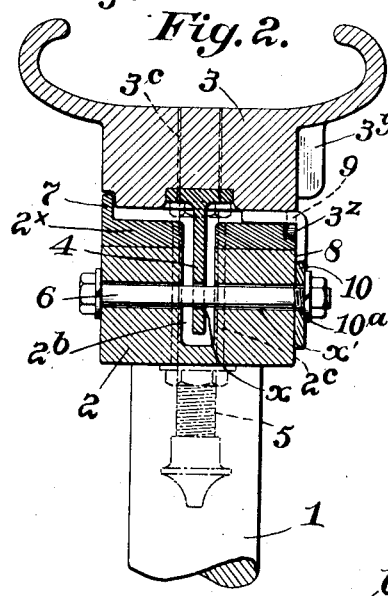

WILLIAM HENRY ROUNDS, OF SIOUX FALLS, SOUTH DAKOTA.

DEMOUNTABLE RIM.

1,344,212.   Specification of Letters Patent.   Patented June 22, 1920.

Application filed December 4, 1919. Serial No. 342,390.

*To all whom it may concern:*

Be it known that I, WILLIAM H. ROUNDS, a citizen of the United States, a resident of Sioux Falls, South Dakota, have invented certain new and useful Improvements in Demountable Rims, of which the following is a specification.

My present invention relates to improvements in demountable rims for vehicle tires and aims to provide a simple, economical and efficient construction which may be easily manipulated, which will be held securely in place upon the wheel felly and yet be capable of being unlocked by the removal of a single bolt, and in which provision is made for the exclusion of mud and dirt.

With these and other objects in view the invention includes the novel features of construction and arrangement and combination of parts hereinafter described and defined by the appended claims.

An embodiment of my invention is illustrated in the accompanying drawings in which—

Figure 1 is a side elevation of a wheel and demountable rim embodying my invention, partly broken away.

Fig. 2 is a transverse sectional view on line 2—2 of Fig. 1, and

Fig. 3 is a fragmentary detail plan view of the inner face of the demountable rim with certain wheel rim parts indicated by dot and dash lines.

Fig. 4 is a fragmentary detail view.

Referring by reference characters to this drawing, the numeral 1, designates a wheel which may be of the ordinary or any desired construction provided with a felly 2, and an outer peripheral felly band $2^x$, which is of plain cylindrical form except for the holding lugs hereinafter described.

The removable or demountable rim is indicated at 3 and may have its channel portion of any desired form or construction designed to receive the ordinary clencher or straight side tire as desired. In the present instance I have for convenience and simplicity of illustration shown it as a clencher rim designed to receive the ordinary clencher tire. The periphery of the wheel rim is provided with a plurality of equally spaced holding lugs, $2^a$ which are provided with notches or recesses $a$ designed to be engaged by corresponding projections $a'$ of similar lugs or holding members $3^a$ formed or otherwise suitably secured to the inner peripheral face of the demountable rim. The demountable rim is provided with a locking projection or fin 4, which is of comparatively thin or web shape and which is designed to fit within a corresponding recess or slot $2^b$ in the wheel rim, which slot is elongated to permit of the demountable rim being given a rotary movement relative to the wheel rim sufficient to permit the projections and recesses of the lugs on the respective parts to be brought into interlocking engagement. These lugs and recesses are relatively tapered or wedge shape as shown, so that such relative rotary or circumferential movement forces them into wedging engagement and securely holds the demountable rim against movement in a lateral direction.

The demountable rim is provided with an opening $3^c$ for the valve stem which latter is indicated by dotted lines at 5, (the tire not being shown) and a similar valve stem opening $2^c$ is formed in the wheel rim adjacent the slot which receives the locking projection or fin 4. The opening $2^c$ is likewise elongated to permit the circumferential movement of the demountable rim carrying the inflated tire with relation to the wheel rim, and the opening $2^c$ may be, as a matter of fact, and preferably is, formed as a widened out continuation of the fin receiving slot or opening $2^b$. In the application of the demountable rim to the wheel the valve stem and locking fin are first inserted in the slots or openings provided therefor, and the opposite side of the demountable rim is then swung over the wheel rim until the coacting recesses and projections of the holding lugs are in alinement whereupon they are engaged by the circumferential movement hereinbefore described.

To prevent accidental circumferential movement of the demountable rim on the wheel rim when the wheel is in use on the vehicle, the locking fin is provided with a hole $x$ and the wheel rim with a corresponding hole $x'$, and a bolt 6 is passed through these alining holes to lock the parts against relative circumferential movement.

The wheel rim is provided on one side with a peripheral flange 7 designed to overlie the corresponding side face of the demountable rim and serve as a stop to limit the movement in assembling and thus insure alinement of the holding lugs, and also to exclude dirt from the joint between the wheel rim and demountable rim. On the opposite side of the wheel the demountable rim is provided with an annular inwardly projecting flange 9 designed to overlie the face of the wheel rim in close contact therewith and thus provide for the exclusion of dirt, the face of the wheel rim being preferably recessed to receive the flange as shown.

As a further means of insuring against accidental circumferential movement of the demountable rim on the wheel rim, the latter is provided with a transverse groove 3<sup>z</sup> which is designed to be engaged by an L-shaped locking member of key 10, the angular end of which is provided with an eye or opening 10<sup>a</sup> designed to have the locking bolt passed therethrough.

The demountable rim may be provided with projections 3<sup>y</sup> which may be tapped by a hammer to start the circumferential movement when the rim is to be removed.

Having thus described my invention, what I claim is—

1. In combination, a wheel rim, having a recess and a transverse bolt opening intersecting said recess, a demountable rim having a locking fin adapted to enter said recess, said wheel rim and said demountable rim having spaced lugs provided with circumferentially disposed interengaging projections and recesses and a bolt removably engaging the bolt opening in said wheel rim and fin.

2. In combination, a wheel rim, having a recess and a transverse bolt opening intersecting said recess, a demountable rim having a locking fin adapted to enter said recess, said demountable rim and said wheel rim having spaced lugs provided with circumferentially disposed interengaging projections and recesses, said demountable rim having a transverse groove adjacent said fin, and an L-shaped locking key having a part resting in said groove and having a part overlying the wheel rim provided with a bolt hole alining with bolt holes in the wheel rim and locking fin, and a bolt engaging said bolt holes.

In testimony whereof I affix my signature.

WILLIAM HENRY ROUNDS.